US006624948B1

(12) United States Patent
Miller et al.

(10) Patent No.: US 6,624,948 B1
(45) Date of Patent: Sep. 23, 2003

(54) METHOD OF FORMING PRECISION GLASS MICROLENS ARRAYS AND A MICROLENS ARRAY FORMED THEREWITH

(75) Inventors: Darryl E. Miller, Honeoye Falls, NY (US); Syamal K. Ghosh, Rochester, NY (US); Donn B. Carlton, Hamlin, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/036,722

(22) Filed: Dec. 21, 2001

(51) Int. Cl.[7] ........................... G02B 27/10; B29D 11/00
(52) U.S. Cl. ......................................... 359/619; 216/26
(58) Field of Search ................................. 359/619, 620, 359/900; 216/26; 65/36, 37, 39

(56) References Cited

U.S. PATENT DOCUMENTS

| | | | |
|---|---|---|---|
| 3,833,347 A | 9/1974 | Angle et al. | 65/32.5 |
| 4,139,677 A | 2/1979 | Blair et al. | 428/409 |
| 4,168,961 A | 9/1979 | Blair | 65/66 |
| 4,797,144 A | 1/1989 | DeMeritt et al. | 65/102 |
| 4,883,528 A | 11/1989 | Carpenter et al. | 65/275 |
| 4,897,101 A | 1/1990 | Carpenter et al. | 65/64 |
| 4,929,265 A | 5/1990 | Carpenter et al. | 65/64 |
| 6,200,491 B1 * | 3/2001 | Zesch et al. | 216/27 |
| 6,305,194 B1 | 10/2001 | Budinski et al. | 65/105 |
| 6,456,436 B2 * | 9/2002 | Miura et al. | 359/619 |

FOREIGN PATENT DOCUMENTS

| | | | | |
|---|---|---|---|---|
| JP | 58171021 A | * | 10/1983 | G02B/27/18 |
| JP | 01107204 A | * | 4/1989 | G02B/3/00 |
| JP | 05313003 A | * | 11/1993 | G02B/3/00 |

OTHER PUBLICATIONS

Photonics Spectra, Jul. 2001, Little Lenses, Major Markets, by Dan Daly and Thomas Hessler, pp. 120–122.
WDM Solutions, Jan. 2001, "Fiberoptic Communications: An Optoelectronics Driver", by Jeff Hecht, pp. 69–72.
WDM Solutions, Mar. 2001, "All–Optical and OEO Switching Will Unleash Real Netowrk Capacity", by Robert Cooper, pp. 31+.

* cited by examiner

Primary Examiner—Ricky Mack
(74) Attorney, Agent, or Firm—Mark G. Bocchetti

(57) ABSTRACT

A method wherein an array of optical elements is formed by forming a mount, including a plurality of element receiving bores therethrough arranged in a predetermined array; placing the mount on a lower mold surface of a lower mold, inserting a glass preform in each of the plurality of element receiving bores, each glass preform extending through a respective element receiving bore, each glass preform extending beyond a top surface of the mount; heating at least the glass preforms to at least a glass transition temperature thereof, aligning an upper mold having an upper mold surface with a plurality of desired optical features formed therein with the predetermined array- and pressing the glass preforms between the upper mold surface and the lower mold surface to mold the glass preforms into the array of optical elements permanently retained in the mount, the pressing of the glass preforms causing glass from each glass preform to flow generally radially outward therefrom across the top surface of the mount thereby creating an upper flange on each element that aids in retaining each optical element in the mount.

7 Claims, 7 Drawing Sheets

METHOD OF FORMING PRECISION GLASS MICROLENS ARRAYS AND A MICROLENS ARRAY FORMED THEREWITH

FIELD OF THE INVENTION

The present invention relates to methods for molding precision optical glass elements having an optical surface, and more particularly, to methods for molding arrays of precisely aligned glass optical elements at high temperatures with aspheric optical surfaces.

BACKGROUND OF THE INVENTION

Microlens arrays provide optical versatility in a miniature package for communications, display and image applications. Traditionally, a microlens is defined as a lens with a diameter less than one millimeter. From the practical point of view, lenses having a diameter as large as five millimeters are also considered microlenses. For many applications, microlenses formed on the ends of optical fibers are employed to couple light from sources such as laser diodes to the fiber.

The use of microlenses in the form of arrays stems from the demand from the end users to work with information in parallel. The technologies of the semiconductor industry, including MEMS (micro electromechanical systems), lend themselves to the formation of arrays.

Microlenses can include diffractive or refractive functions, or the combinations thereof for athermal or achromatic elements. In fact, the benefits of refractive lenses, including achromatism efficiency and high numerical apertures, make them the most attractive for communication applications.

As individual elements, microlenses can have a wide range of parameters. Diameters can range from a few microns to a few millimeters. Their focal ratios, that is, the ratio of focal length to lens diameter, can range from f/0.8 to infinity. The optical surface can be either spherical or aspherical. Microlenses can be made from a variety of materials such as plastics, glasses and exotic materials like gallium phosphide.

Design issues for discrete microlenses and microlens arrays are very similar to those of conventional large lenses, so the rules of optics still apply. Since the apertures of microlenses are so small, diffraction effects are more dominant than refraction effects. The most common fabrication techniques for microlens arrays include direct etching of the lens profile using photolithographic masks or contact masks, diffusing materials with different refractive indices into a substrate, swelling defined areas of a substrate, and forming and solidifying drops of liquid having desirable refractive index on a surface.

Manufacturing specifications and tolerances for micro optical arrays are governed by the specific application and defined by the end user accordingly. For example, the typical focal length variation across an array comprising microlenses having diameters in the range of from 0.1 mm to 1.0 mm for communication use is 1 to 2 percent. The cumulative pitch tolerance from one microlens to another must be less than 1 $\mu$m. The optical surfaces are specified as plano/convex asphere. The surface figure requirement is better than $\lambda/8$ at where the wavelength ($\lambda$) is 632 nm, and the center thickness tolerance of the array must not exceed 2 $\mu$m.

The stringent specification for the microlens arrays for telecommunication application makes it necessary to synchronize a web of manufacturing technologies to attain the final goals. The manufacturing process can be broadly divided into three basic steps. These steps are originating the shape of the lens, creating a master mold, and finally forming the lens profile on the surface of the selected optical material. The origination of the shape generally comprises photolithography technology to create a mask for reactive ion etching.

Another commonly used manufacturing technique is to reflow a photoresist. This method comprises coating a substrate with a selected photoresist, exposing it to LN radiation through a mask, or alternatively, subjecting the photoresist to gray scale laser exposure. Upon heating the substrate, the exposed photoresist melts and surface tension pulls the material in the form of convex lenses. The depth of the photoresist determines the focal length of the lens.

Ion exchange is another method, which has been used for some time to manufacture microlenses. Ions are diffused into a glass rod to give a radial refractive index distribution which guides the light and that forms a focus. The index of refraction is highest in the center of the lens and decreases quadratically as a function of radial distance from the central axis. Microlenses made using this ion exchange technology are widely used to collimate light from fibers as, for example, in telecommunications. As applications warrant larger and larger arrays of channels, users are moving away from discrete microlenses towards microlens arrays.

Depending on the application, microlens materials may vary. For high volume applications using visible light, it is desirable to mass produce plastic optics using an injection molding process. One advantage of injection molding is that high-resolution molding technique can mold the optical element as part of the system casing. This method is very cost-effective because the labor associated with alignment and assembly is eliminated.

The optimal transmission wavelength for telecommunication is in the far infra-red wavelength, which is around between 1300 and 1550 nm. Therefore, the materials that work in this wavelength region are becoming more important. The two most common materials are fused silica and silicon, both of which have advantages and disadvantages as well for this application. Other optical quality materials are being tested and considered.

As mentioned earlier, the applications for microlenses are very broad. The primary use of microlenses in telecommunication is to match light from free space into fibers and to collimate light coming out of fibers. The microlens will require a numerical aperture that matches the fiber and a diameter of about 1 mm so that the diameter matches the free space beam. The microlenses are used in individual channels, although they are normally arranged in arrays of channels in 1×8, 1×12, 10×10, or even higher configurations. Some of the larger free-space devices are now using more than 1000 channels.

The manufacturing process for the production of glass microlens arrays generally involves reactive ion etching (RIE) of fused silica. RIE of fused silica is a relatively standard technology but, fabrication of microlens arrays having the stringent specifications dictated by the telecommunication industry is by no means an easy or routine task. It is very difficult to meet all the requirements of microlens arrays using this technology. This technology also involves many steps before the final product is produced and consequently the yield is very poor and the products are not cost competitive.

Compression molding of optical quality glass to form microlenses is also well known. This method comprises compressing optical element preforms, generally known as gobs in the art, at high temperatures to form a glass lens element. U.S. Pat. No. 3,833,347 to Angle et al, U.S. Pat. Nos. 4,139,677 and 4,168,961 to Blair et al, U.S. Pat. No. 4,797,144 to DeMeritt et al, and U.S. Pat. Nos. 4,883,528 and 4,897,101 and U.S. Pat. No. 4,929,265 to Carpenter et al described the basic process and apparatus for precision glass molding of optical elements. These patents disclose a variety of suitable materials for construction of mold surfaces used to form the optical surfaces in the molded glass optical elements. In the compression molding process described in the above patents, a gob is inserted into a mold cavity. The molds reside within an oxygen-free chamber during the molding process. The gob is generally placed on the lower mold and heated above the glass transition temperature (Tg) and near the glass softening point so that the viscosity of the glass is within $10^6$ and $10^9$ poise. The upper mold is then brought in contact with the gob and pressure is applied to conform to the shape of the mold cavity. The molds and the molded lens are then allowed to cool well below Tg and the pressure on the molds are relieved and the lens is removed.

The method described above works perfectly well when molding a discrete lens from a single cavity mold from one preform or gob. Press molding an array of microlenses using one or more preforms is subject to many difficulties which include alignment of mechanical and optical axes of each lens element with respect to a common axis, and location of each lens element with respect to a reference point in the array. Furthermore, it is extremely difficult to machine convex aspheric mold cavities using conventional techniques if the microlens diameter is less than 1 mm. U.S. Pat. No. 6,305,194 B1 to Budinski et al. teaches a method and apparatus for compression molding a glass microlens array from a single gob. Careful control is required to make the gob flow uniformly over the entire mold surface without trapping any air or gas molecules in the individual mold cavities. If there is variation of temperature across the mold surface, the glass flow may be non-uniformn and leave flow marks on the lens elements. More importantly, this invention relies on making negative mold surfaces using conventional machining techniques, which is practical if the lens diameter is greater than 1 mm.

Consequently, there is a need for an improved method of forming microlens arrays which may not involve the conventional MEMS or RIE techniques, but a novel compression molding process.

SUMMARY OF THE INVENTION

It is therefore an object of the present invention to provide a method for compression molding integrated microlens arrays of precisely aligned glass optical elements and the microlens arrays molded therewith.

It is a further object of the present invention to provide a method for compression molding linear or two-dimensional arrays of microlenses.

It is another object of the present invention to provide a method for compression molding linear or two-dimensional arrays of microlenses wherein the individual lens elements are in registration with respect to a reference point or each other.

Still another object of the present invention is to provide a method for compression molding linear or two-dimensional arrays of microlenses which utilizes a mounting structure in the molding operation that forms a permanent part of the integrated molded microlens arrays.

Yet another object of the present invention is to provide a method for compression molding linear or two-dimensional arrays of microlenses which uses discrete glass preforms for each individual lens element in the array.

Briefly stated, the foregoing and numerous other features, objects and advantages of the present invention will become readily apparent upon a reading of the detailed description, claims and drawings set forth herein. These features, objects and advantages are accomplished by providing a method wherein an array of optical elements is formed by forming a mount, including a plurality of element receiving bores therethrough arranged in a predetermined array; placing the mount on a lower mold surface of a lower mold; inserting a glass preform in each of the plurality of element receiving bores, each glass preform extending through a respective element receiving bore, each glass preform extending beyond a top surface of the mount; heating at least the glass preforms to at least a glass transition temperature thereof, aligning an upper mold having an upper mold surface with a plurality of desired optical features formed therein with the predetermined array; and pressing the glass preforms between the upper mold surface and the lower mold surface to mold the glass preforms into the array of optical elements permanently retained in the mount, the pressing of the glass preforms causing glass from each glass preform to flow generally radially outward therefrom across the top surface of the mount thereby creating an upper flange on each element that aids in retaining each optical element in the mount. The lower mold surface is also configured to impart to the discrete glass preforms the desired optical features to the bottom surfaces thereof. Each preform includes optical quality top and bottom surfaces prior to compression molding. Typically, the optical quality surfaces are provided by well-known polishing operations. The mount is preferably made from a ceramic material selected to have a coefficient of thermal expansion that approximates the coefficient of thermal expansion of the glass preforms in order to prevent any distortion of the final product.

The ceramic mount and the lower mold are preferably configured to create a chamber or plurality of chambers between a bottom surface of the mount and a lower mold surface with each glass preform extending through the chamber to rest on the lower mold surface. When this chamber is present, the method also includes the step of causing glass from each glass preform to flow generally radially outward therefrom in the chamber(s) thereby creating a lower flange on each optical element that aids in retaining each optical element in the mount.

After the array of lens elements has been molded into the mount, it is then cooled to below the glass transition temperature. Then the array of lens elements, now permanently retained in the mount, is removed from between the upper mold and the lower mold. In the practice of the method of the present invention, the apparatus chamber in which molding is preformed is environmentally controlled. A vacuum may be drawn or the chamber may be purged with a non-reactive gas-like nitrogen or argon to promote an oxygen-free environment.

Through the practice of the method of the present invention, microlens arrays can be produced wherein the arrays include discrete lens elements having diameters less than 1 mm. Further, imperfections or artifacts that can be created by glass flow when an entire array is formed from a single preform are eliminated because the discrete glass preforms used in the practice of the present invention are not forced into a semi-viscous flow situation.

DETAILED DESCRIPTION OF THE INVENTION

Figure 1:
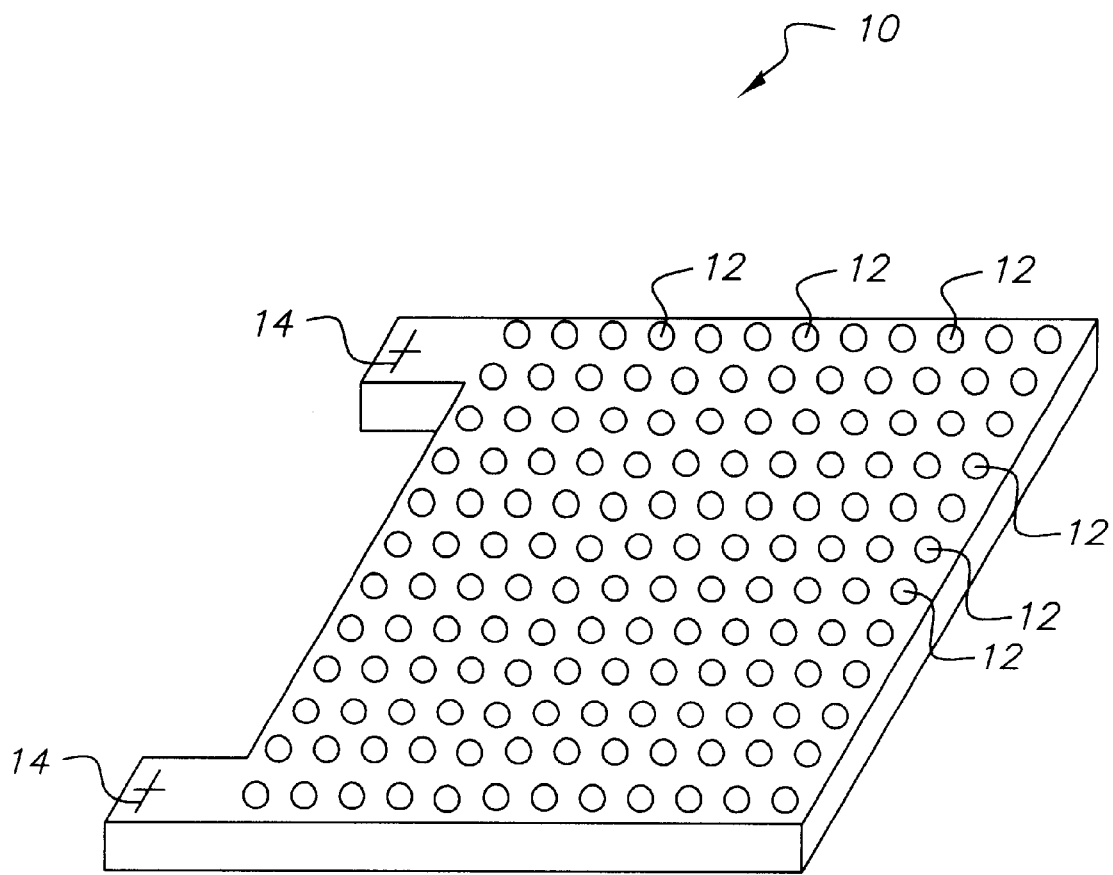
FIG. 1 is a perspective view of an exemplary ceramic mount for use in the practice of the present invention.

Turning first to FIG. 1, there is shown a perspective view of an exemplary sintered ceramic mount 10 for use in the practice of the invention. The exemplary sintered ceramic mount 10, as depicted, includes a 12×12 array of precision bores 12 therethrough. Although it is shown in FIG. 1 as a 12×12 array, it is possible to produce mounts for microlens arrays having M×N lens elements, wherein M is the number of lens elements in the x-direction and N is the number of lens elements in the y-direction. Any given precision bore 12 must conform to a very stringent dimensional tolerance and must be spaced apart from the neighboring precision bore 12 by a predetermined distance. The dimensional tolerance for center-to-center distance between adjacent precision bores 12 should not exceed 1 $\mu$m and the tolerance for diameter of each precision bore 12 must be less than 1 $\mu$m. Typically, for a particular mount to be used in the production of a predetermined microlens array, bore diameter may vary between 0.5 mm and 5.0 mm and center-to-center distance may vary from 1 to 10 mm.

The ceramic mount 10 can be produced using a variety of consolidation processes such as, dry pressing, cold isostatic pressing, injection molding, and gel casting. The ceramic material should be selected so as to match or at least approximate the coefficient of thermal expansion (CTE) of the glass preforms. The ceramic material can be selected from oxides, such as alumina, zirconia, magnesia, titania; carbides, such as silicon carbide, titanium carbide, tungsten carbide; nitrides, such as silicon nitride, boron nitride, titanium nitride, aluminum nitride; borides, such as titanium boride, zirconium boride, nickel boride; and a mixture of two or more ceramic materials thereof. The ceramic mount 10 can be molded net shape including the precision bores 12 therethrough. Alternatively, a ceramic mount blank can be produced and the precision bores 12 may be drilled therethrough during the green stage or after sintering depending on the desired dimensional tolerance and precise location of each bore 12 in the ceramic mount 10. Fiducial marks 14 can be laser marked on the surface of the ceramic mount 10 for the purpose of precision alignment of the bores 12 and the individual preforms 16 residing therein (see FIG. 2) with respect to upper and lower molds during the molding process as will be explained in details later.

It is very important that the thermal behavior of the ceramic mount and that of the glass preforms 12 are very alike. The glass molding process is done at relatively high temperature, typically in the range between 400° C. and 800° C., which is at or slightly higher than the Tg of the selected glasses. The relative rate of thermal expansion of the preform glass and the ceramic mount should be very close to each other so that the stress developed while cooling during the molding process is minimized. Excessive stress in the molded microlens array can resort to cracking or physical deformation. The CTE of the ceramic mount can be tailored to match that of the preform glass. The CTEs of some preferred micro-lens glasses are given below:

| | | |
|---|---|---|
| Schott SF-57 | $97 \times 10^{-7}/°$ C. | (20 to 300° C.) |
| Hoya TaC-4 | $67 \times 10^{-7}/°$ C. | (100 to 300° C.) |

The above CTE values can be closely matched by selecting a ceramic or ceramic composites comprising two or more ceramics. Below are given the CTE values of some selected ceramics:

| | | |
|---|---|---|
| $Al_2O_3$ | $79 \times 10^{-7}/°$ C. | (40 to 800° C.) |
| $ZrO_2$ | $110 \times 10^{-7}/°$ C. | (40 to 800° C.) |
| MgO | $135 \times 10^{-7}/°$ C. | (40 to 800° C.) |
| SiC | $44 \times 10^{-7}/°$ C. | (40 to 800° C.) |
| $Si_3N_4$ | $32 \times 10^{-7}/°$ C. | (40 to 800° C.) |
| $SiO_2$ | $86 \times 10^{-7}/°$ C. | (40 to 800° C.) |

From this, it can be seen that the CTE of $Al_2O_3$ is relatively close to that of Schott SF-57 glass. Alternatively, for example, a 50—50 composite of $Al_2O_3$—$ZrO_2$ can be made having CTE $95 \times 10^{-7}$ which matches very closely to the CTE of the exemplary preform glass, Schott SF-57 ($97 \times 10^{-7}/$°C.). Ceramic mounts 10 can be made from ceramic composites by selecting two or more ceramics in proportions which would yield a CTE close to that of the selected glass for micro-lens array.

Figure 2:
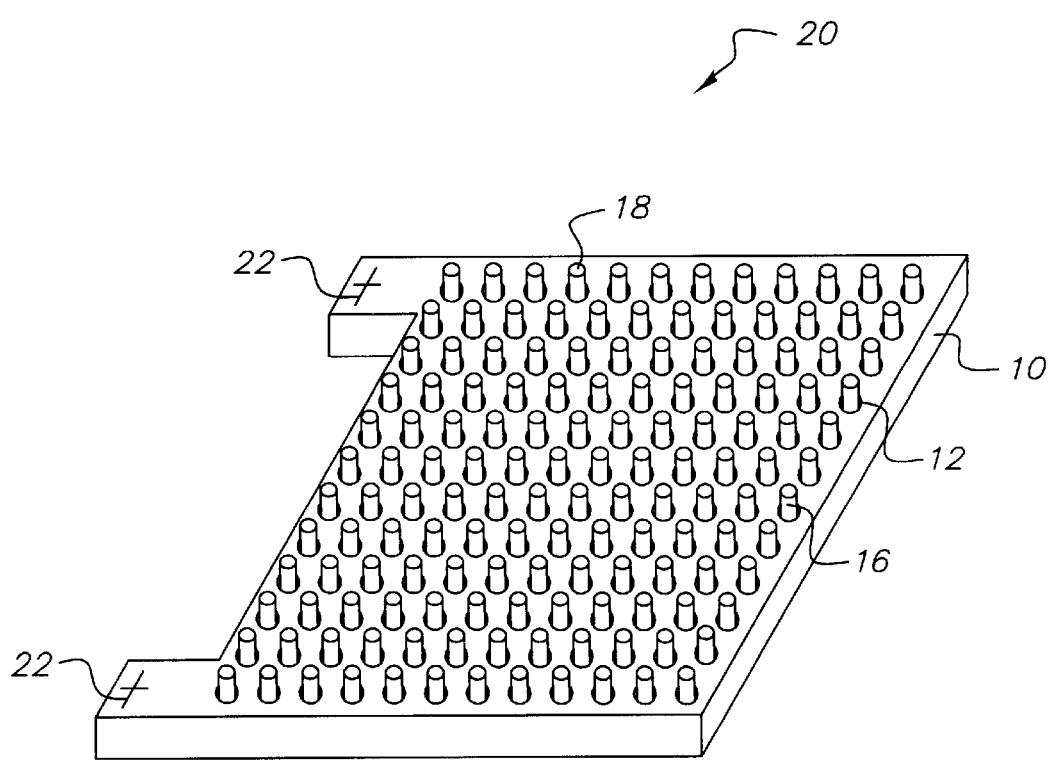
FIG. 2 is a perspective view of the exemplary ceramic mount shown in FIG. 1 loaded with glass preforms.
Figure 3:
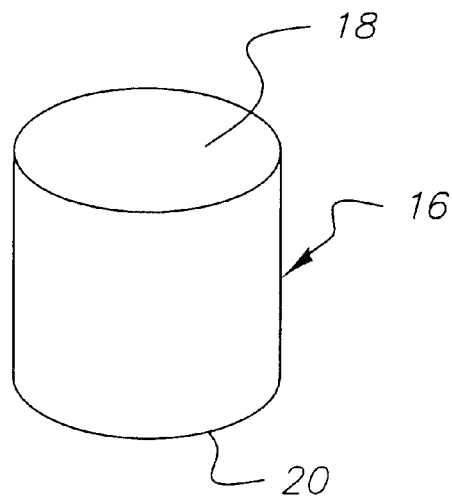
FIG. 3 is a perspective view of one shape of a glass preform that can be used in the practice of the present invention.
Figure 4:
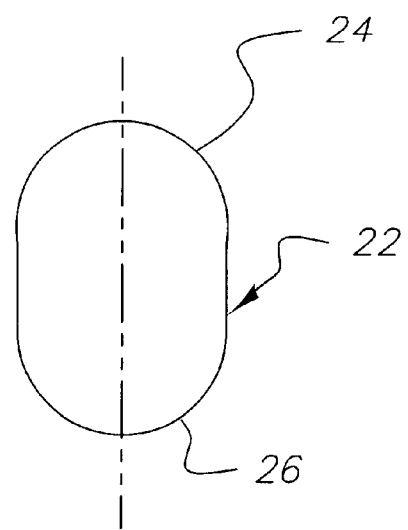
FIG. 4 is a perspective view of a second shape of a glass preform that can be used in the practice of the present invention.

Referring to FIG. 2, there is shown the ceramic mount 10 of FIG. 1 loaded with a plurality of glass preforms 16. Each glass preform 16 is placed in a corresponding bore 12 prior to compression molding of the array. Each glass preform 16 (see FIG. 3) is cylindrical and is preferably cut or cleaved from a precision glass rod. Each glass preform 16 includes an upper surface 18 and a lower surface 20 which are polished to a plano optical quality surface. FIG. 4 depicts an exemplary alternative preform 22 which may also be used in the practice of the present invention. Glass preform 22 is generally cylindrical with convex end surfaces 24, 26 which may be spherical or aspherical. Glass preforms 22 may be formed by known grinding and polishing methods, or alternatively, by the method of rolling spherical preforms under pressure to form cylinders with convex optical quality end surfaces as taught in U.S. application Ser. No. 09/882, 599 filed Jun. 15, 2001 and entitled "Cold Rolling of Glass Preforms". These preforms 22 are preferred if the optical elements of the microlens array are to have convex spherical or aspherical optical surfaces. Preforms 16, 22 can be produced very precisely with existing technology so that the mass of each preform may not vary more than 1 microgram. Furthermore, these preforms 16, 22 are provided with polished optical surfaces prior to compression molding so that no artifacts are generated during the compression molding process.

Figure 5:
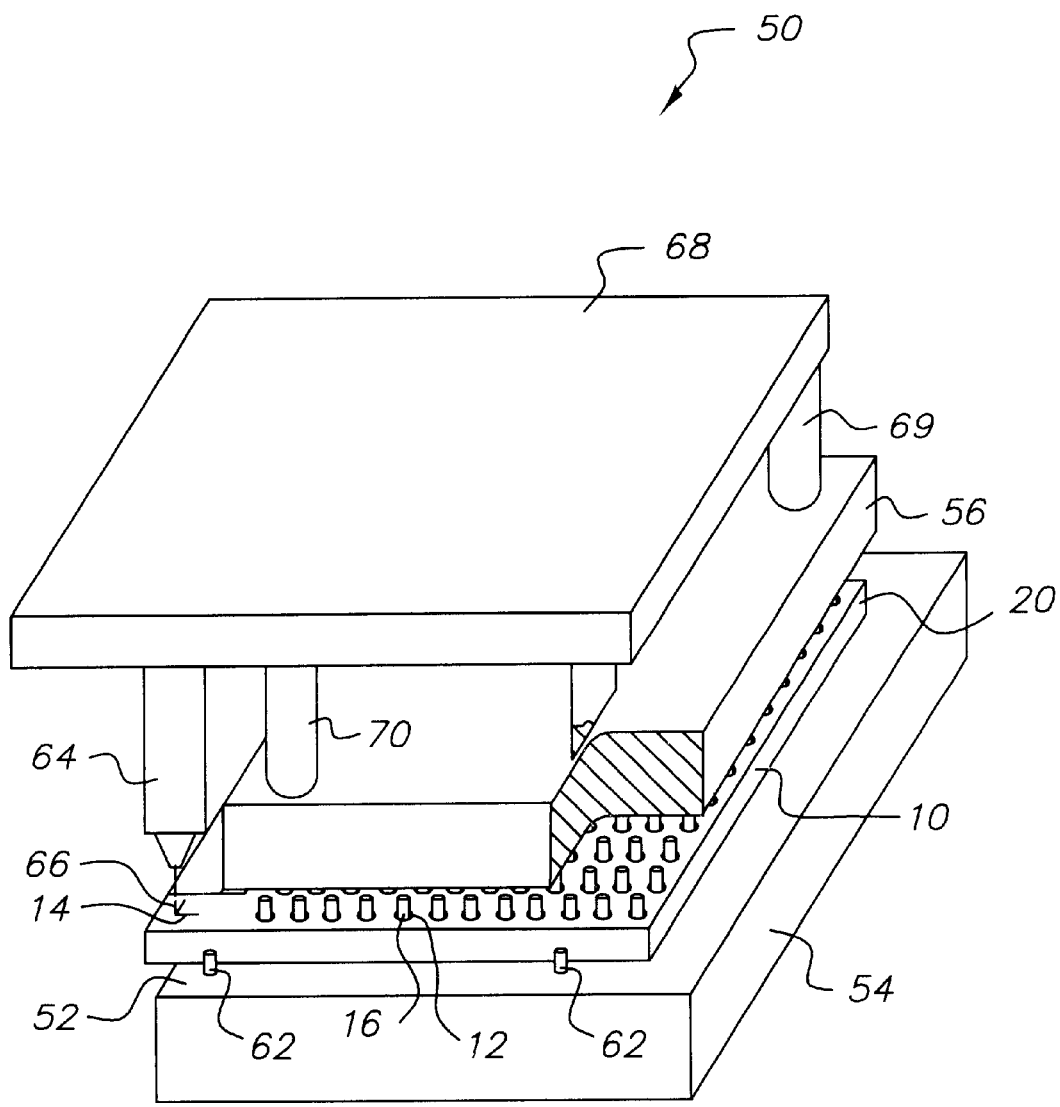
FIG. 5 is a perspective partially cut away view of a compression mold assembly immediately prior to the molding step in the practice of the method of the present invention.
Figure 6:
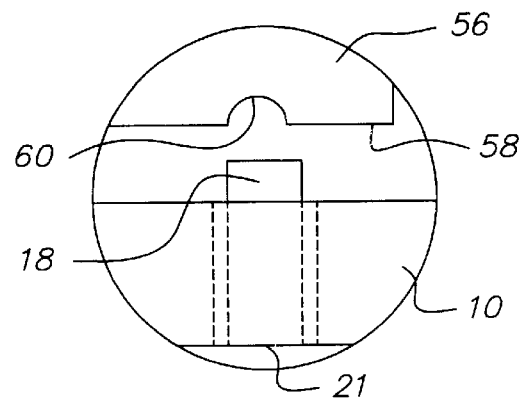
FIG. 6 is an enlarged detail view of that portion of FIG. 6 contained within circle 7.

Referring next to FIG. 5, there is shown a compression mold assembly 50 immediately before the molding step. The compression mold assembly 50 is located inside a compression molding chamber (not shown). The ceramic mount 10 containing a cylindrical preform 16 in each precision bore 12 is placed on the mold surface 52 of lower mold 54. Mold surface 52 will typically be flat such that the optical surfaces formed therewith of the bottom of each preform 16 will be plano. However, mold surface 52 may be configured to impart non-plano optical surface features to the surfaces of 20 of each preform 16. There is an upper mold 56 that is spaced above the loaded ceramic mount 10. The mold surface 58 of upper mold 56 has a desired aspherical negative cavity 60 as shown in FIG. 6 aligned with each bore 12 in the ceramic mount 10. Preform surface 18, on which the convex aspherical optical surface of each lens element is to be molded, has a plano surface feature having an optical surface finish. Alternatively, the preform 22 can be used such that surface 24 has a convex shape, either spherical or aspherical as dictated by the final lens element geometry of the microlens array.

Referring back to FIG. 5, compression mold assembly 50 includes an arrangement for mechanical and/or optical alignment of the preforms 16 loaded in mount 10 with respect to the optical element mold features of the upper mold surface 58 (see FIG. 6) as well as any optical element mold features that may be present in the lower mold surface 52. The ceramic mount 10 may first be placed on the lower mold surface 52 between a set of pins 62 for mechanical alignment with respect to the upper mold 56. The lower mold 54 can be moved along x and y directions so that a laser 64 projecting a beam 66 can be used to locate and align with fiducial marks 14 for final precision alignment. The upper mold 56 is supported from precision metal block 68 through metal posts 69. The metal block 68 is fastened to the upper moving platform (not shown) of the compression molding machine.

As mentioned above, the mold or top surface 52 of the lower mold 54 as depicted is planar so that the bottom surface 20 of each preform 16 molded therewith is plano. Also, as mentioned above, in another embodiment of the present invention, features can be added to the mold or top surface 52 of the lower mold 54 so that the bottom surface 20 of each preform 16 molded therewith includes a predetermined and desired feature. Such predetermined features include, for example, projections from the mold surface 52 that would create a cavity in the bottom surface of each lens element of the array for easy alignment and subsequent attachment of optical fibers (not shown).

Figure 7:
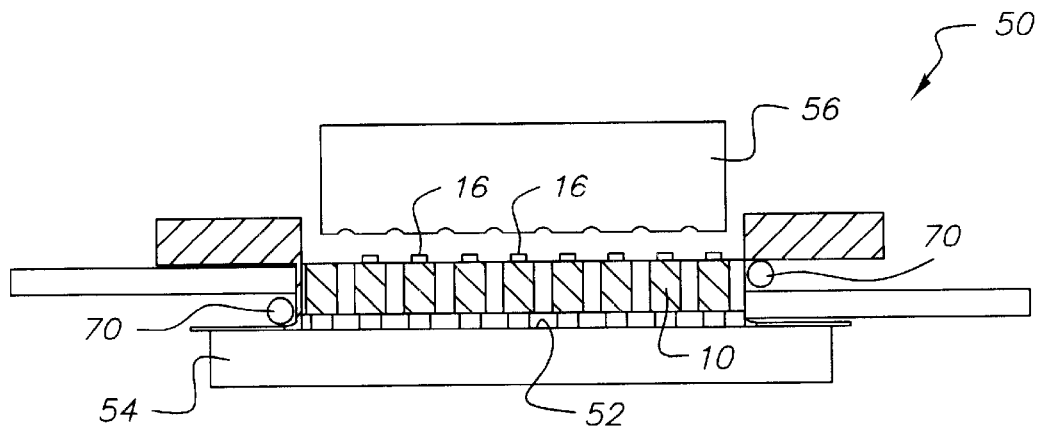
FIG. 7 is a partial sectional view of a compression mold assembly showing the position thereof immediately prior to the molding step in the practice of the method of the present invention.
Figure 8:
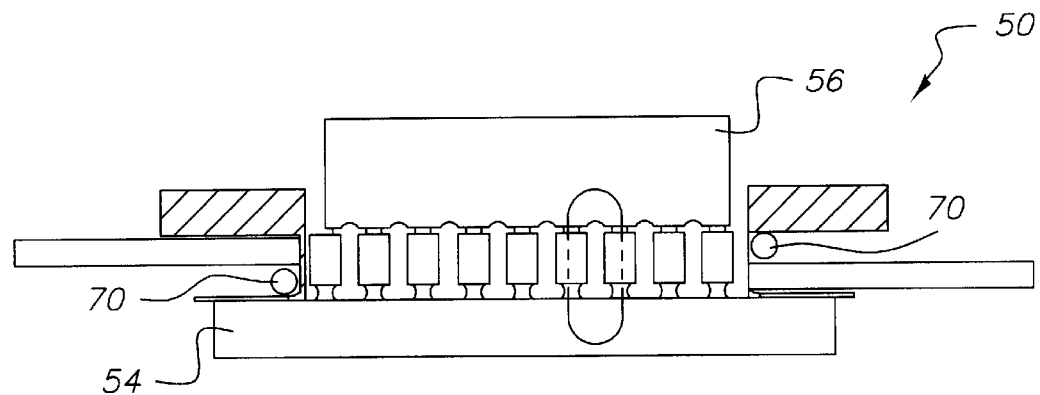
FIG. 8 is a partial sectional view of a compression mold assembly showing the position thereof at the completion of the molding step in the practice of the method of the present invention.

Turning next to FIGS. 7 and 8 there is shown a partial sectional schematic view of the mold assembly 50. FIG. 7 shows the assembly 50 right before the compression molding process is initiated while FIG. 8 illustrates the mold assembly 50 after the compression molding step is completed. In FIG. 7, the ceramic mount 10 is positioned on the lower mold surface 52 such that each preform 16 in the ceramic mount 10 is aligned with the corresponding mold feature (negative aspherical cavity) 60 in upper mold 58 (see FIG. 6). This alignment procedure was described earlier. This alignment step is critical in the compression molding process because mechanical and optical axes of each microlens element must coincide to produce a usable array for a telecommunication application. As or prior to the point in time that the mold surface 58 of the upper mold 56 is brought in contact with the top surfaces 18 of the preforms 16, the compression molding chamber is either evacuated or flooded with nitrogen or argon gas and the heating element 70 is energized. For rapid heating and faster compression molding cycles, induction heating is preferred but another heating source such as resistive heating can also be used. Compression pressure is applied after the preforms 16 have reached or exceeded the glass transition temperature, Tg, and then cooled slowly to prevent any thermal shock. The compression molding step thus forms an integrated array 100 of microlens elements 102 permanently retained in a mount 10.

Figure 9:
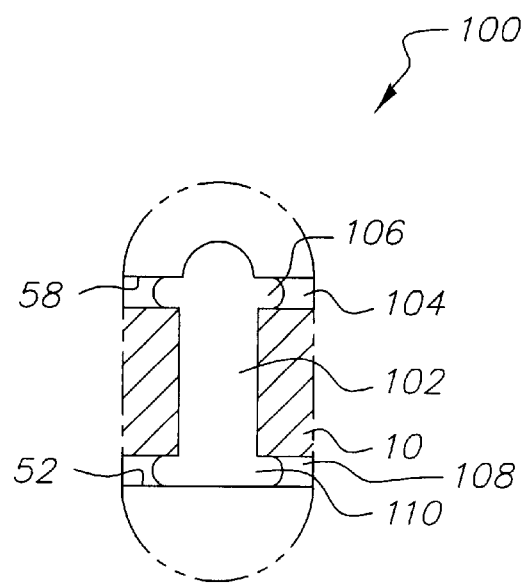
FIG. 9 is an enlarged detail view of that portion of FIG. 8 contained within circle 9.

Looking next at FIG. 9 there is shown an enlarged detail view of one microlens element 102 in microlens array 100 (still residing between the upper and lower molds). During the compression molding step the amount of travel of the upper mold 56 is controlled such that the upper mold surface 58 is never brought into contact with mount 10. In this manner, there is a cavity 104 between mount 10 and the upper mold surface 58. Excess material of each preform 16 migrates into such cavity typically by flowing radially outward from each preform 16 during the molding step. This results in the formation of a flange 106 extending from each microlens element 102 that aids in retaining the microlens elements 102 in mount 10. As shown in FIGS. 7 through 9, mount 10 may be shaped to provide a lower cavity 108 between the lower mold surface 52 and mount 10. Such lower cavity 108 also allows for the migration of some excess material from each preform 16 typically by flowing radially outward from each preform 16 during the molding step. This results in the formation of a second flange 110 extending from each microlens element 102 that aids in retaining the microlens elements 102 in mount 10. Thus, the method of the present invention enables anchoring each microlens element 102 to the ceramic mount 10 by one or two flanges in addition to friction resulting from the preform engaging the internal wall of each bore during the molding step.

Figure 10:
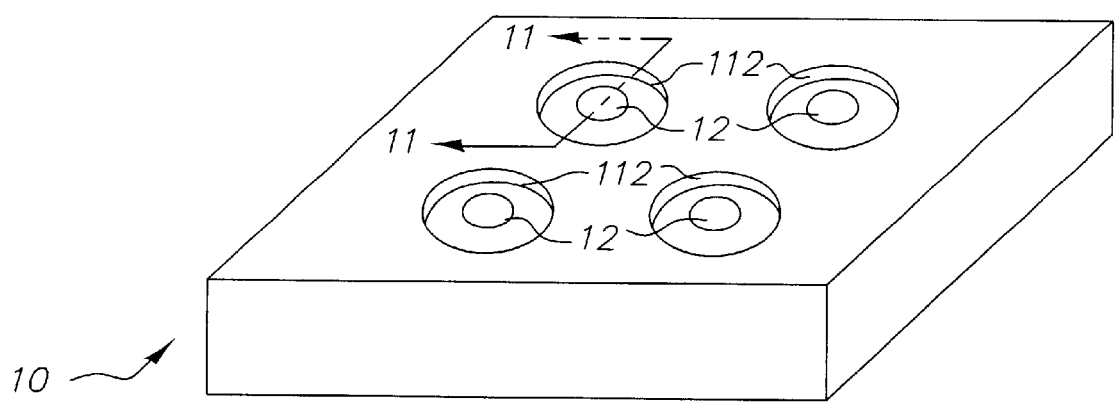
FIG. 10 is a perspective view of mount having multiple cavities formed in a surface thereof.
Figure 11:
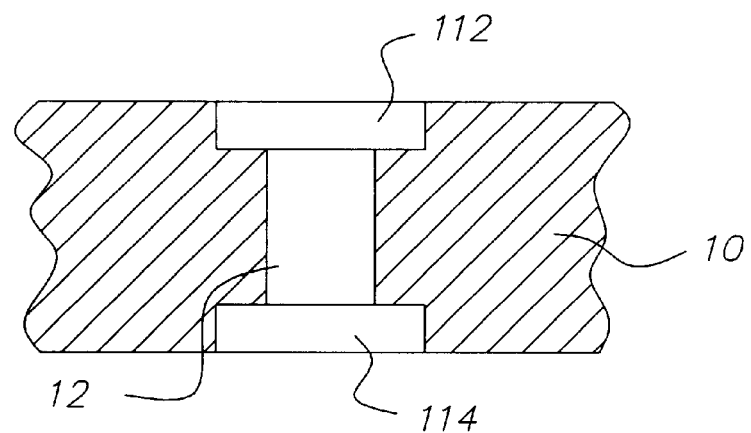
FIG. 11 is a partial cross-sectional view taken along line 11—11 of FIG. 10.
Figure 12:
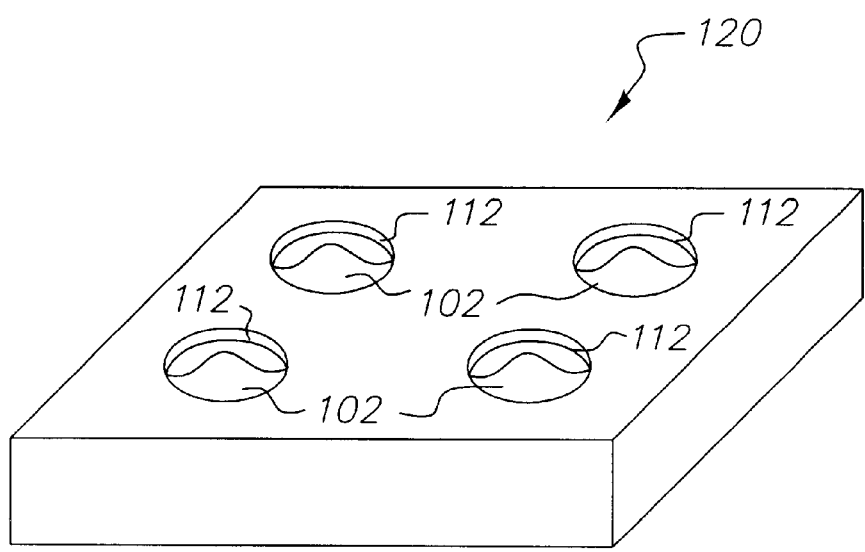
FIG. 12 is a perspective view of an exemplary 2×2 microlens array of the present invention.

Cavity 104 is depicted as a single large cavity in which all flanges 106 reside. It should be appreciated however that cavity 104 may be comprised of a plurality of cavities such as, for example, by providing a recess 112 in mount 10 around each bore 12 such that each recess 112 provides residence for each flange 106 (see FIGS. 10 and 11). Similarly, it should also be appreciated however that lower cavity 108 may be comprised of a plurality of cavities such as, for example, by providing a recess 114 in mount 10 around each bore 12 such that each recess 114 provides residence for each flange 110. A perspective view of an exemplary 2×2 microlens array 120 showing recesses 112 is illustrated in FIG. 12.

Cavities 104, 108 may be created by the shape of the mount 10, the shape of the lower mold 54, the shape of the upper mold 56, and/or spacer elements placed between the upper mold 56 and mount 10 and between the lower mold 54 and mount 10. As such, cavities 104, 108 may or may not be part of a final molded array of the present invention.

Blair et al describes in U.S. Pat. No. 4,139,677 details of compression molding process to form glass lens elements wherein molds were used having mold surfaces formed of silicon carbide or silicon nitride. In the present invention, molds are fabricated of silicon carbide wherein cavities for the optical surfaces in the lens array is machined defining each cavity a predetermined volume, size and shape. If the cavity geometry is complex and it is not possible to machine those features using a conventional grinding and polishing process, MEMS or RIE methods are used to form the molds of fused silica and a release coating, such as hard carbon or silicon carbide or both is applied so that the heat softened glass lens elements do not adhere to the mold surface. Another advantage of using fused silica molds is that optical alignment of the mold cavities with respect to preforms is accomplished more accurately using a laser.

The present invention is particularly suitable for production of microlens arrays having an aspheric surface profile. Furthermore, this method is particularly suitable for microlens arrays having a lens diameter smaller than 1 mm and the spacing between lens elements is from 0.5 to 2.0 mm.

From the foregoing, it will be seen that this invention is one well adapted to attain all of the ends and objects hereinabove set forth together with other advantages which are apparent and which are inherent to the process.

It will be understood that certain features and subcombinations are of utility and may be employed with reference to other features and subcombinations. This is contemplated by, and is within the scope of the claims.

As many possible embodiments may be made of the invention without departing from the scope thereof, it is to be understood that all matter herein set forth and shown in the accompanying drawings is to be interpreted as illustrative and not in a limiting sense.

PARTS LIST 10 ceramic mount
12 precision bores
14 fiducial marks
16 glass preforms
18 upper surface
20 lower surface
22 alternative glass preforms
24 convex end surfaces
26 convex end surfaces
50 compression mold assembly
52 mold surface
54 lower mold
56 upper mold
58 mold surface
60 negative aspherical cavity
62 pins
64 laser
66 beam
68 metal block
69 metal posts
70 heating element
100 integrated arrays
102 microlens elements
104 cavity
106 flange
108 lower cavity
110 $2^{nd}$ flange
112 recess
114 recess
120 microlens array

What is claimed is:

1. A method of forming an array of optical elements comprising the steps of:
    (a) forming a mount, including a plurality of element receiving bores therethrough arranged in a predetermined array;
    (b) placing the mount on a lower mold surface of a lower mold;
    (c) inserting a glass preform in each of the plurality of element receiving bores, each glass preform extending through a respective element receiving bore, each glass preform extending beyond a top surface of the mount;
    (d) heating the glass preforms to at least a glass transition temperature thereof;
    (e) aligning an upper mold having an upper mold surface with the predetermined array; and
    (f) pressing the glass preforms between the upper mold surface and the lower mold surface to mold the glass preforms into the array of optical elements permanently retained in the mount, the pressing of the glass preforms causing glass from each glass preform to flow generally radially outward therefrom across the top surface of the mount thereby creating an upper flange on each element that aids in retaining each optical element in the mount.

2. A method as recited in claim 1 wherein:
    the mount and the lower mold are configured to create a chamber between a bottom surface of the mount and a lower mold surface, each glass preform extending through the chamber to rest on the lower mold surface.

3. A method as recited in claim 2 further comprising the step of:
    causing glass from each glass preform to flow generally radially outward therefrom in the chamber thereby creating a lower flange on each element that aids in retaining each optical element in the mount.

4. A method as recited in claim 2 further comprising the step of:
    heating the upper and lower mold to at least the glass transition temperature of the glass preforms.

5. A method as recited in claim 2 further comprising the step of:
    cooling the array of optical elements to below the glass transition temperature.

6. A method as recited in claim 2 further comprising the step of:
    removing the array of optical elements permanently retained in the mount from between the upper mold and the lower mold.

7. A method as recited in claim 1 further comprising the step of:
    forming the mount from a ceramic material having a coefficient of thermal expansion that approximates a coefficient of thermal expansion of the glass preforms.

* * * * *